(No Model.) 2 Sheets—Sheet 2.
C. D. DORMAN.
FENDER FOR STREET CARS.
No. 594,938. Patented Dec. 7, 1897.
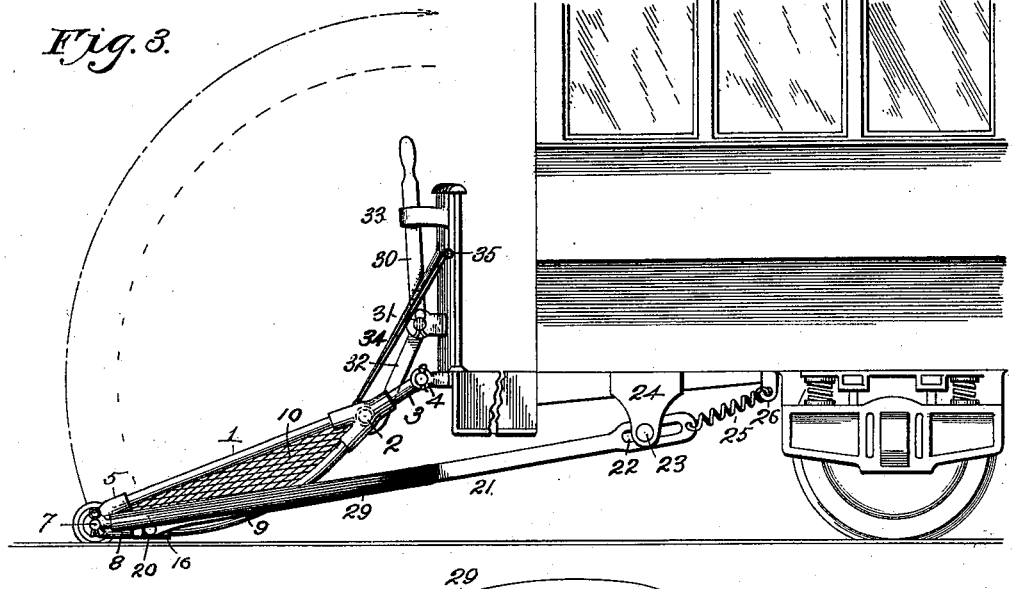
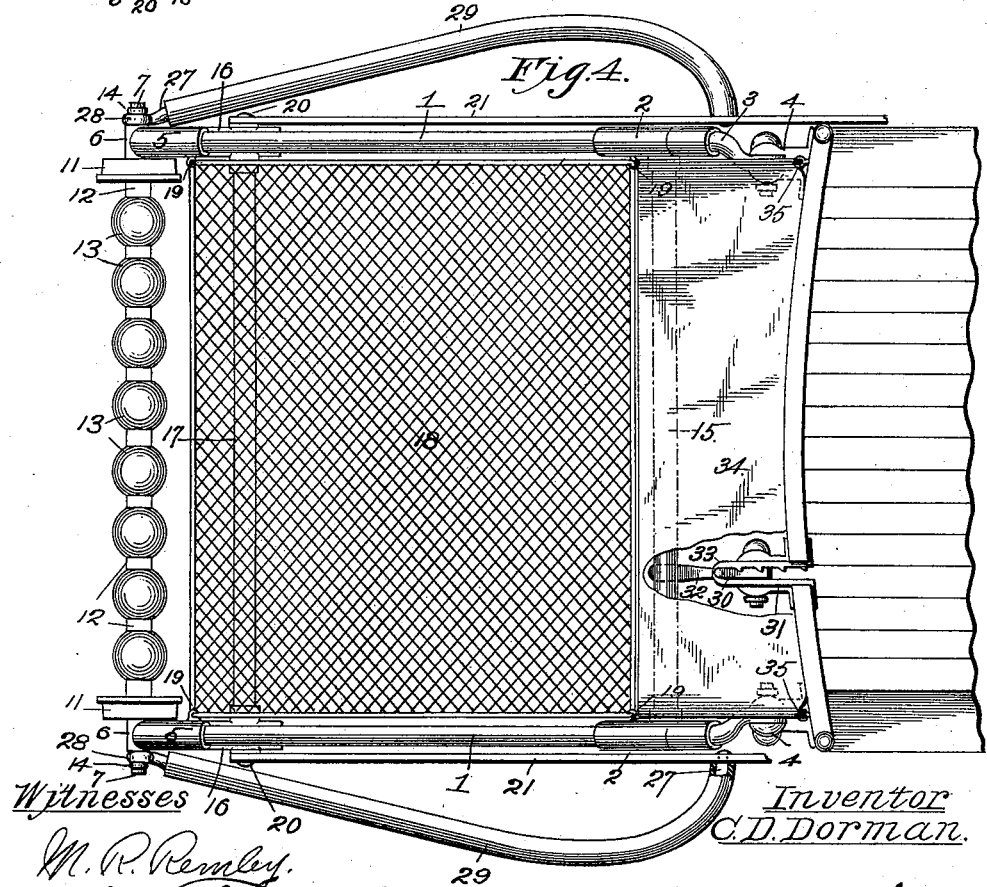
Witnesses
M. R. Remley.
G. H. Thorpe.
Inventor
C. D. Dorman.
by Hyson & Hidden
Attys.

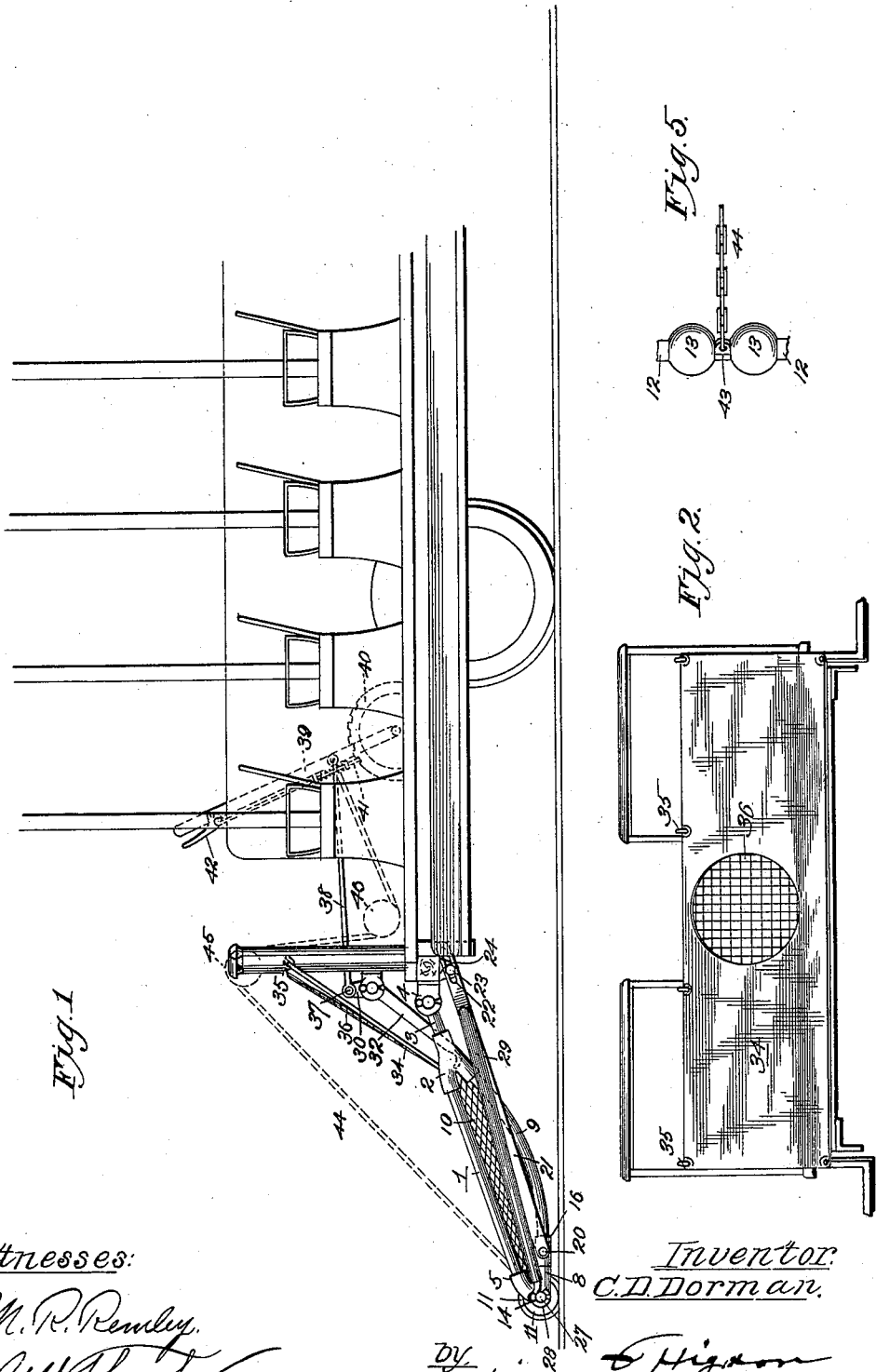

UNITED STATES PATENT OFFICE.

CHARLES D. DORMAN, OF CLINTON, MISSOURI.

FENDER FOR STREET-CARS.

SPECIFICATION forming part of Letters Patent No. 594,938, dated December 7, 1897.

Application filed November 16, 1896. Serial No. 612,318. (No model.)

*To all whom it may concern:*

Be it known that I, CHARLES D. DORMAN, of Clinton, Henry county, Missouri, have invented certain new and useful Improvements in Safety-Fenders for Street-Cars, of which the following is a full, clear, and exact description, reference being had to the accompanying drawings, forming a part thereof.

My invention relates to safety-fenders for street-railway cars both of the cable and electric type; and it consists in certain novel and peculiar features of construction and combinations of parts, which will be hereinafter described and claimed.

The object of the invention is to produce a safety-fender to be carried at the front end of a car of the type which will automatically accommodate itself to the grade over which the car is traveling and which may be easily, quickly, and conveniently raised from the track when the car is on a curve or be raised to a vertical and inoperative position when desired.

A further object is to produce a fender which can be quickly and easily transferred from one end of a car to the opposite end.

In order that the invention may be fully understood, I will proceed to describe it with reference to the said accompanying drawings, in which—

Figure 1 represents in side elevation a grip-car provided with a fender embodying my invention. Fig. 2 represents a front view to illustrate the position and relation of the flexible extension of the fender proper. Fig. 3 represents a side elevation of a car of the electric type provided with a fender constructed in accordance with my invention. Fig. 4 represents a plan view of the same, on an enlarged scale. Fig. 5 is a detail view to illustrate the connection with the front end of the fender of a modified means for raising the same.

Similar numerals refer to corresponding parts throughout the several views, in which—

A fender-framework is constructed, preferably, of gas-pipes, and consists of side bars 1, connected at their rear ends to pipe-couplings 2, which couplings are mounted upon the arms 3, pivoted to brackets 4, projecting from the front end of the car. The lower ends of the pipes 1 engage pipe-couplings 5, provided with transversely extending and alined sections 6, which are connected by and form bearings for the shaft or axle 7. The couplings 5 are also each provided with a third member 8, and said members are connected by curved pipes 9 with the couplings 2, as shown clearly in Figs. 1 and 3.

The pipes 1 and 9 are in vertical alinement with each other and are connected by wire netting or gauze of coarse mesh, as shown at 10, so as to prevent an arm or lower limb of a person caught by the fender from protruding between the side pipes of the frame and becoming injured. It also prevents any small obstructions which may be on the track and which are caught by the fender from passing through between said side bars and getting in the way of the wheels of the car.

Mounted at the front and lower end of the fender upon the axle or shaft 7 just inward of the bearing 6 are the flanged wheels 11, which roll upon the car-track, and by following the same maintain the front end of the fender at the required distance from the ground—that is to say, these wheels follow the irregularities of the surface of the tracks and thereby prevent the fender when approaching the foot of a steep grade from striking it. It is to be understood, however, that these guide-wheels 11 may be dispensed with, if required, and the front end of the fender relative to its distance from the ground be under the control entirely of the grip or motor man of the car by means which will be hereinafter described. Mounted also upon said axle or shaft and arranged alternately, preferably, are a series of supporting-tubes 12 and rubber balls 13, so that in case a person is struck by the advance end of the fender he will not be severely bruised, as will be the case when contacted by metal or other hard or unyielding substance. It may be stated here also that in lieu of the flanged track-rollers 11, which of course serve as a guide to prevent any lateral or twisting movement of the fender, I may employ rubber rollers, which will be allowed to contact with the track only when an object is to be picked up or a collision with a person is expected to occur. This is done, of course, that the shock or jar of a weight suddenly deposited upon the fender may be received, chiefly, by the track-rails and not by the mechanism for raising and supporting the fender in its elevated position. The shaft is preferably maintained in its position in the bearing 6 by means of the spring-cotters 14.

The couplings 2 are connected together by means of the cross-pipe 15, so as to brace and strengthen the frame at its rear end, and to insure and complete the rigidity of the structure the couplings 16 upon the pipes 9 are also connected by a cross-pipe 17, arranged a slight distance in rear of and parallel with the shaft or axle 7, as shown clearly in Fig. 4.

The bottom of the fender consists, preferably, of a section of wire-gauze 18, attached, as at 19, at its corners to the couplings 2 and 5, as shown in Fig. 4, or in any other suitable manner. The gauze bottom thus arranged positively and reliably receives any person or article falling upon the fender and supports them safely until they are removed after the movement of the car has been arrested.

Pivoted, as at 20, at their front ends to the couplings 16 are a pair of parallel bars 21, and said bars at their rear ends are provided with longitudinal slots 22, mounted upon bolts 23, carried by brackets 24, depending from the car. In Fig. 3 said bars are of greater length, preferably, than in Fig. 1 and are connected by retractile springs 25 with brackets 26, depending also from the car-frame, the tendency of said springs being to hold the front end of the fender depressed and to prevent its jumping up and down each time that it encounters a slight irregularity in the surface of the track. Said springs may, however, be dispensed with, as the weight of the fender alone will probably be sufficient to hold it snugly against the track at all times when not raised by the attendant in control.

In order to throw or force a person or object to one side or to throw the person in such a position that he will be picked up by the fender, I have provided a pair of guides or deflectors. These guides or deflectors consist of rods 27, bent as illustrated in Fig. 4 and secured at their rear ends to the bars 21 and at their front ends, as at 28, upon the axle or shaft 7 and between the bearings 6 and the spring-cotters 14, and said rods, which are of spring-steel, are incased by tubes 29, of rubber, to prevent severe injury to the person who is struck by said guards or deflectors.

30 designates a lever which is pivotally mounted, as at 31, in a bracket projecting from the front end of the car at any suitable point, and said lever is provided with a depending arm 32, which engages the under side of the cross-pipe 15 of the frame. The upper end of said lever, which is of spring-steel, is embraced by the U-shaped segment 33, provided internally with ratchet-teeth in order that when the lever is pulled rearwardly, and the front end of the fender consequently elevated, said lever may be sprung laterally into engagement with one or another of the said teeth and be securely and reliably held in such position, owing to the strain imposed upon it by the weight of the supporting-fender. To lower it, the attendant simply pushes the lever out of engagement with said tooth, and the fender drops back to its original position.

In order to prevent a person who falls upon the fender from being injured by striking the coupler (not shown) of the car or the brackets which carry the fender and said lever, I provide an extension 34, preferably of canvas or other strong flexible material, though, of course, it may be of wire-gauze. This extension-guard also prevents the limbs or head of a person deposited upon the fender or any article picked up by the latter from protruding through the space between the bottom of the fender and the dashboard of the car by bridging said space and extending obliquely from the rear edge of said bottom to said dashboard near its upper end, to which it is connected, as at 35. At its lower end it is preferably connected at the points 19 coincidentally with the points of connection with the rear corners of the bottom, as shown clearly in Fig. 4, and in case it bridges the space opposite the headlight of the car I preferably form it centrally with an opening, covered by a section 36 of wire gauze, through which the headlight may be plainly visible.

Referring now particularly to Fig. 1, it will be noticed that the lever 30 is extremely short, and in lieu of a handle is pivotally connected, as at 37, to a rod 38, extending rearwardly and connected to a lever 39, arranged within convenient reach of the gripman and adjacent to a notched sector 40. Said lever carries the customary spring-actuated dog 41 to engage said sector and a handle 42 by which said dog may be retracted. By swinging said lever back and forth the frame will be raised or lowered.

If it be desired to employ other means for raising and lowering the fender, either upon an electric car or upon a grip-car, I may attach to the middle of the axle a lug 43 and connect the same by means of a chain or cable 44 with the lever 39, guiding said chain in any suitable manner.

Thus it will be seen that I have produced a street-car fender which automatically adjusts itself to slight irregularities in the surface of the track and to grades, whether steep or otherwise, and which, furthermore, is under perfect control of the grip or motor man, that he may quickly and easily raise it in turning curves or lower it to operative position in case an accident with a person on the track or other object be imminent.

It is to be understood, of course, that various changes may be made in the detail construction and arrangement of parts without departing from the spirit and scope or sacrificing any of the advantages of my invention.

Having thus described the invention, what I claim as new, and desire to secure by Letters Patent, is—

The combination with a street-car, of a fender pivoted to and projecting in advance of the car, side bars pivoted to the fender and provided with slots at their rear ends, pins carried by the car and engaging said slots, and springs connecting the rear ends of said bars with fixed points of the car, substantially as described.

In testimony whereof I affix my signature in presence of two witnesses.

CHARLES D. DORMAN.

Witnesses:
M. R. REMLEY,
G. Y. THORPE.